United States Patent
Maquaire

(10) Patent No.: US 6,976,391 B2
(45) Date of Patent: Dec. 20, 2005

(54) SYSTEM FOR REGULATING TIRE INFLATION PRESSURE

(75) Inventor: Michel Maquaire, Ardon (FR)

(73) Assignee: Syegon, Versailles (FR)

( * ) Notice: Subject to any disclaimer, the term of this patent is extended or adjusted under 35 U.S.C. 154(b) by 10 days.

(21) Appl. No.: 10/472,397

(22) PCT Filed: Feb. 22, 2002

(86) PCT No.: PCT/FR02/00656

§ 371 (c)(1),
(2), (4) Date: Oct. 21, 2003

(87) PCT Pub. No.: WO02/074561

PCT Pub. Date: Sep. 26, 2002

(65) Prior Publication Data

US 2004/0112130 A1 Jun. 17, 2004

(30) Foreign Application Priority Data

Mar. 20, 2001 (FR) .............................................. 01 03730

(51) Int. Cl.[7] .............................................. G01M 17/02
(52) U.S. Cl. ...................... 73/146; 73/146.2; 73/146.3
(58) Field of Search ................................ 73/146–146.8

(56) References Cited

U.S. PATENT DOCUMENTS 4,742,857 A 5/1988 Gandhi
5,853,020 A * 12/1998 Widner ........................ 137/227
6,322,161 B1 * 11/2001 Maslonka et al. ............ 303/89
6,685,281 B2 * 2/2004 MacGregor et al. ........ 303/123

FOREIGN PATENT DOCUMENTS

EP 0 621 144 A1 10/1994

* cited by examiner

*Primary Examiner*—William Oen
*Assistant Examiner*—Jermaine Jenkins
(74) *Attorney, Agent, or Firm*—Oliff & Berridge, PLC

(57) ABSTRACT

The invention relates to a system for regulating the pressure in a tire comprising an outer casting (3) which is mounted on a rim (2).

The tire comprises an inner casting (5) which is disposed at the bottom of the rim (2) and which can constitute a high-pressure air reserve, a first actuator (6) which is integrated in the inner casting (5) and which authorizes the flow of air to the outer casting (3) for inflation purposes, a second actuator (8) which is integrated in the outer casting (3) and which authorize the release of air to the outside for deflation purposes; an electronic assembly which can send information to one or other of the actuators (6, 8) and/or receive the information delivered by the detector(s) (7, 9) in order to control the pressure and the temperature in the outer casting (3) and/or in the inner casting (5), a mean for controlling said electronic assembly and a keyboard.

The inventive system is suitable for vehicles.

14 Claims, 1 Drawing Sheet

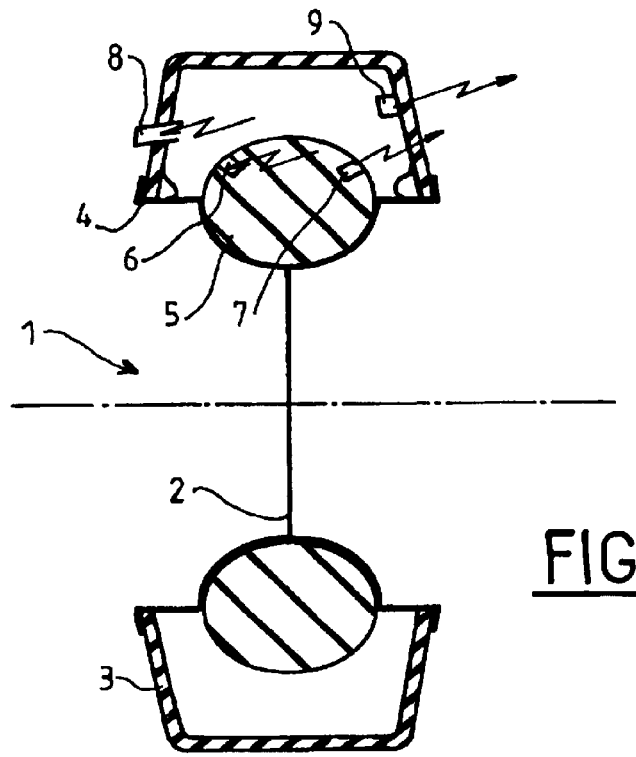
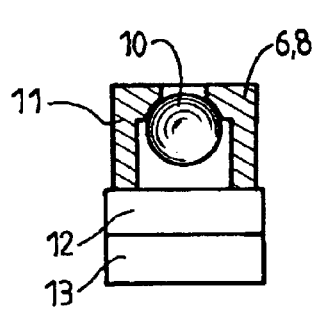
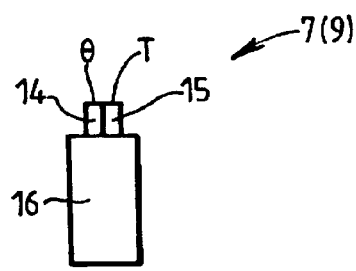
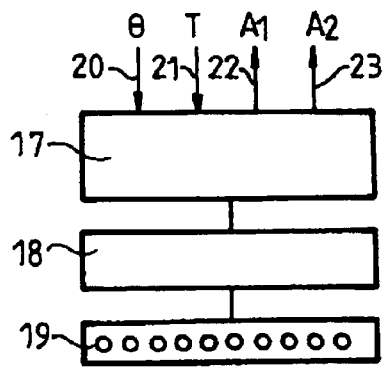

SYSTEM FOR REGULATING TIRE INFLATION PRESSURE

The technical scope of the present invention is that of systems for regulating and control the pressure of tires.

In the preferred domain of application above, it has already been proposed to integrate a pneumatic valve into a classical pneumatic tire intended principally to ensure the inflation and deflation of the tire. The valve is controlled by a pneumatic unit, itself automatically piloted by an electronic unit or manually by push buttons. For greater detail, reference may be made to patents EP-0246953 and EP-029617. In this embodiment, the particular structure of the pneumatic tire is not described and we note that inflation is provided by a source that is outside the tire.

However, the simple inflation and deflation of a tire by means of an external source is no longer satisfactory nowadays since the users require the pressure in the volume of the tires to be managed automatically according to the condition of the ground over which they are driving and the detection of any type of anomaly in said volume to be carried out both automatically and autonomously. Reference may be made to patent FR-88.00476 that describes a system to keep a tire pressurized.

The aim of the invention is to propose a reliable system to control the pressure of a pneumatic tire that integrates a pressure source and constantly, and automatically, controls the condition of said tire.

The invention thus relates to a system for regulating the pressure in a pneumatic tire that is constituted by an outer casing mounted on a wheel rim, wherein the tire comprises an inner casing arranged at the bottom of the rim and able to constitute a high pressure air container, a first actuator integrated into the inner casing allowing the passage of air into the outer casing to inflate it, a second actuator integrated into the outer casing allowing air to be evacuated to the outside to deflate it, an electronic assembly able to emit data to one or other of the actuators and/or to receive data given by the detector or detectors to control the pressure and temperature in the outer casing and/or inner casing, control means for the electronic assembly and a keyboard, said system controlling the value of the pressure in the outer casing between a minimal and a maximal value according to a control logic in relation with the external conditions to which the tire is subjected and ensuring the constant control of the value of said pressure in said tire.

Advantageously, the control means are in the form of an electronic unit enclosing the control logic means.

Advantageously again, the keyboard incorporates indicators of the condition of a pneumatic tire that can be seen by an operator and means to display a correction or pressure settings for the pressure in the tire being controlled.

The keyboard may be integral with the control means.

Advantageously again, the system comprises means to detect a pneumatic releasing air and to locate said pneumatic tire.

Advantageously again, the system comprises settings that are differentiated according to the loading of the vehicle, for example, fully loaded, half-loaded or empty and this for each type of ground, plus an overspeed indicator.

Advantageously, an actuator comprising a source of electrical energy constituted by an electronic system able to recover and store the energy from the inertia linked to the acceleration and deceleration of the vehicle or the cyclical deformation of the pneumatic tire or transmitted by radio frequency or transponder.

The source of electrical energy may be connected to a dynamo drives by the acceleration or deceleration of the vehicle.

The pneumatic tire may comprise a first temperature and pressure detector integrated into the inner casing and intended to measure the pressure and temperature in said casing.

The pneumatic tire may comprise a second temperature and pressure detector integrated in the outer casing and intended to measure the pressure and the temperature in said casing.

Advantageously, the detector is equipped with an emitter that can be triggered either remotely to transmit the temperature and pressure data, or automatically in the event of a variation in the pressure and temperature parameters that is over or under a pre-determined setting.

Advantageously again, the system comprises either a system to constantly maintain the pressure of the inner casting, or minimal pressure values in the inner casting so as either to alert the driver so that he re-pressurizes it via an external intervention, or to trigger an automatic re-inflation device that may be integrated into the vehicle or in the wheel.

A first advantage of the pneumatic tire system according to the invention lies in the simplified structure of the vehicle wheels able to integrate all the elements allowing its inflation pressure to be managed and its condition to be known.

Another advantage of the invention lies in the constant availability of a source of compressed air in the inner casting allowing the outer casting to be rapidly inflated.

Another advantage of the invention lies in the isolation of the pressure source with respect to the exterior.

Another advantage of the invention lies in the fact that the pressure source allows the vehicle to run normally in the event of a flat tire.

Another advantage of the invention lies in the fact that the system allows the operator to impose a setting that is different from the automatically imposed setting.

Another advantage lies in the fact that the system allows one volume to be isolated from the rest of the installation in the event of a serious mishap.

Another advantage of the system according to the invention lies in the fact that one volume may be changed without disturbing the operation of the whole system.

Other characteristics, particulars and advantages of the invention will become more apparent from the description given hereafter by way of illustration and with reference to the appended drawings, in which:

FIG. 1 is a schematic section of a tire according to the invention,

FIG. 2 shows the schematic reproduction of one embodiment of an actuator,

FIG. 3 shows the schematic reproduction of one embodiment of a sensor, and

FIG. 4 shows the schematic reproduction of the control system.

FIG. 1 shows the wheel 1 of a vehicle not shown, constituted by a wheel rim 2 onto which an outer casting 3 is mounted. The rim 2 has a peripheral part 4 having a hollow. An inner casting 5 is advantageously placed in the hollow. This casting 5 may be in the shape of a thick-walled closed tube or solid flange provided with intercommunicating perforations. This casting 5 may be put under high pressure, for example $100.10^5$ Pa without any constant inflation system used or for example 5 to $10.10^5$ Pa if a constant inflation system is used to constitute a tank of compressed air intended to supply the outer casting 3.

The inner casting 5 is sufficiently hard and resistant to constitute a wheel tread in the event of a non-compensated flat of the outer casting 3.

The inner casting 5 is provided with a first actuator 6 whose function is to allow compressed air to pass into the outer casting 3. Thus, by successive air inputs it is possible for the pressure in the outer casting 3 to be adjusted. The casting 5 is also provided with a first detector 7 intended to measure the temperature and pressure in the interior, the purpose of which will be explained hereafter.

The casting 3 is provided with a second actuator 8 intended to make it communicate with the exterior. The opening of this actuator 8 is controlled by means described after in order to ensure the rapid or slow deflation of the casting 3. The casting 3 is also provided with a sensor 9 to measure the pressure and temperature inside it.

The structure of the sensors 7 and 9 is such that the data relative to the measurements taken is remotely transmitted either continuously for a certain lapse of time, or else periodically as required by the user, or else entirely randomly according to a control logic.

The structure of the tire described therefore allows us during normal operation to do without an external pressure source and simplifies the different controls or orders required to regulate the tire pressure according to the use to which the vehicle is put, the condition of the road surface, the load carried or any other relevant parameter.

FIG. 2 shows an embodiment of an actuator 6 (or 8) in the form of a non-return valve comprising, for example, a ball 10 pressing on a seat delimited by a support 11. The ball 10 is connected to control means 12 intended to ensure the ball is lifted from its seat. A power source 13 supplies the means 12 with an electrical current, for example. By way of example, the source 13 may be constituted by an electronic system able to recover and store either the energy from the inertial effects linked to the acceleration or deceleration of the vehicle, or the cyclical deformations of the tire's sides, or a transponder with transmission by radio frequency.

Thus, a dynamo driven in rotation during the acceleration or deceleration movements of the vehicle constitutes energy production means that can be miniaturized. The opening of the actuator is controlled by a receiver integrated into the control means 12. This actuator can be made in a very compact form with a very low mass enabling the normal balancing of the wheel.

FIG. 3 shows a sensor 7 (or 9) comprising a probe 14 or detector to measure the temperature, and a probe 15 or detector to measure the pressure. These probes are connected to an emitter 16. Naturally, the sensor may be controlled to switch it off or on. The emitter may be triggered either remotely to transmit the temperature and pressure data upon request or automatically in the event of the variation of the temperature and pressure parameters exceeding the pre-established settings.

According to the invention, a regulation system is added to the previously described tire, such system allowing the pressure in the outer casting 3 to be controlled and automatically varied according to certain criteria such as the load carried or the road conditions.

We understand that for the user such a possibility is desirable. Indeed, the structure of a vehicle is not stressed in the same way when it is fully loaded, half-loaded or empty. It is the same case when a vehicle is driving over rough ground, sand, road or motorway. By adjusting the inflation pressure, this stress can be reduced to a level compatible with required safety and mobility criteria and with the normal service life of the vehicle. Moreover, it is essential for the condition of the vehicle tires to be known at all times, in particular in the event of a flat or irreparable damage.

Advantageously again, the system comprises either a system to constantly maintain the pressure in the inner casting, or minimal pressure values in the inner casting so as either to warn the driver so that he can carry out a re-pressurization operation externally, or to trigger an automatic re-inflation device that can be integrated into the vehicle or the wheel.

FIG. 4 shows the different components of the control system which comprises an electronic assembly 17, control means 18 and a keyboard 19.

The electronic assembly 17 ensures all the control functions provided by a control logic.

This assembly either allows the tire 1, or alternatively a group of tires, to be inflated or deflated, automatically monitors the tires by constant display of the pressure and temperature, automatically adjusts the tire pressure according to a setting, detects and locates a volume releasing air, compensates this, isolates a tire from the rest of the system if this can not be compensated, provides data concerning overspeed and corrects the pressure. Naturally, this assembly incorporates electronic means allowing the detection of the pressure and temperature that may be integrated into the volume or placed at a distance in relation to the actuators and detectors described previously.

The assembly 17 may comprise a first receiver 20 in relation with the probes 14 of the sensors 7 and 9 of each tire and a second receiver 21 in relation with the probes 15 of these sensors; these two receivers may be joined. The assembly 17 also incorporates an emitter 22 in relation with the actuator 6 and a second emitter in relation with the actuator 8.

Thus, the signal transmitted by the emitter 16 is received and processed in the control means so as to transmit the data to the keyboard 19.

The control means 18 comprise an electronic unit enclosing control logic means allowing each of the measurements required for the system to function to be initiated. It is therefore a series of commands or a programme allowing a display on the keyboard 19 to reflect the order given. Thus, if we want to inflate the casting 3 to a pre-determined setting, for example after moving from soft ground to road, the opening of the actuator 8 is controlled so as to make the pressure source formed by the inner casting 5 communicate with the casting 3. When the setting is reached, that is when there is no difference between the two values, the unit 18 controls the closing of the actuator 6. An analogous process is adopted to ensure the deflation of the casting 3. When the command is given, the actuator 8 is opened and air escapes outside. The same process occurs when the pressure of a tire is to be controlled. The pressure sensor is activated by the control means 18 and the value measured is displayed on the keyboard. The means 18 naturally distinguish between the different tires transmitting the data.

A regular control of the pressure tank 5 is built in so as to check it is working properly and measure its air pressure. Thus, for a pressure in the tire 2 of up to 800 kPa, the pressure in the inner casting 5 might be, for example, of around 1,200 kPa with a system of constant inflation, or of around 10,000 kPa without this device. If the pressure in casting 5 becomes lower than that in casting 3, the system continues to operate in a downgraded mode in which inflation is no longer possible, the other functions remaining available.

The keyboard 19 incorporates indicators showing the condition of the volume that can be seen by the operator and means to display a correction or setting for the pressure in the volume. This keyboard may incorporate, for example, an indicator by pressure threshold according to the ground and load of the vehicle, an indicator of the load itself, an indicator for anomalies in the pressure accumulator, an indicator for anomalies of one part of the system, an indicator locating the volume releasing air, an indicator showing the condition of a damaged volume such as a flat either able to be compensated by constant inflation, or not. All these indicators are initiated by the electronic assembly or on the contrary, the value displayed by an operator is transmitted by the keyboard 19 to the means 18 which in turn controls the selected organ.

The keyboard may be made integral with the control means.

The system may comprise an overspeed indicator. This may prove important when the nominal tire pressure displayed does not correlate with the vehicle's speed. The system according to the invention comprises means to compare the vehicle's speed to the maximum speed allowed for the nominal pressure displayed. The corresponding indicator is triggered in the keyboard and the driver of the vehicle is warned of this situation. He may then choose to correct the inflation setting until the overspeed signal disappears. If the driver does not take action within a given lapse of time, the inflation pressure may be automatically corrected according to a speed table integrated into the unit 9 upon delivery of the system.

The system according to the invention may ensure both the slow deflation of the outer casting 3 and its fast deflation. By slow deflation, we mean for example deflation from $2.5.10^5$ Pa to $2.10^5$ in 5 mn. By fast deflation, we mean for example deflation from $2.10^5$ Pa to $10^5$ Pa in a few seconds.

This fast deflation may be important in the event of black ice or emergency braking so as to rapidly adapt the skid resisting properties of the tires.

What is claimed is:

1. A system for regulating pressure in a tire comprising an outer casting mounted on a wheel rim, wherein the tire comprises an inner casting disposed at an end of the wheel rim, a first actuator integrated into the inner casting allowing a passage of air to the outer casting to inflate the outer casing, a second actuator integrated into the outer casting allowing the air to be evacuated to deflate the outer casting, an electronic assembly able to emit data at least to one of the actuators and/or to receive data given by at least one detector in order to control a pressure and a temperature in the outer casting and/or the inner casting, and a controller for the electronic assembly and a keyboard, the system controlling a value of the pressure in the outer casting between a minimal and a maximal value according to a control logic in relation with external conditions to which the tire is subjected and ensuring a constant control of the value of the pressure in the tire.

2. The system according to claim 1, wherein the controller is in the form of an electronic unit enclosing control logic means.

3. The system according to claim 1, wherein the keyboard incorporates indicators of a condition of the tire that can be seen by an operator and displays a correction or pressure settings for the pressure in the tire being controlled.

4. The system according to claim 1, wherein the keyboard is integral with the controller.

5. The system according to claim 1, further comprising a detector that detects the tire releasing air and locates the tire.

6. The system according to claim 1, further comprising settings that are differentiated according to a loading of the vehicle.

7. The system according to claim 6, wherein the settings are for fully loaded, half loaded or empty and for each type of surface.

8. The system according to claim 1, further comprising an overspeed indicator.

9. The system according to claim 1, wherein at least one of the actuators comprises a source of electrical energy comprising an electronic system able to recover and store the energy from inertia linked to an acceleration and deceleration of a vehicle or a cyclical deformation of the tire or transmitted by radio frequency or transponder.

10. The system according to claim 9, wherein the source of electrical energy is connected to a dynamo driven by the acceleration or deceleration of the vehicle.

11. The system according to claim 1, wherein the tire comprises a first temperature and pressure detector integrated into the inner casting in order to measure a pressure and temperature in the inner casting.

12. The system according to claim 11, wherein the second temperature and pressure detector is equipped with an emitter that can be triggered either remotely to transmit temperature and pressure data, or automatically in an event of a variation in pressure and temperature parameters that is over or under a pre-determined setting.

13. The system according to claim 1, wherein the tire comprises a second temperature and pressure detector integrated in the outer casting in order to measure the pressure and the temperature in said casting.

14. The system according to claim 1, wherein the inner casting is disposed at a peripheral part of the wheel rim.

* * * * *